(12) United States Patent
Kumagai et al.

(10) Patent No.: US 6,505,717 B2
(45) Date of Patent: Jan. 14, 2003

(54) CLUTCH WEIGHT FOR WET CENTRIFUGAL CLUTCH AND PROCESS FOR PRODUCING THE SAME

(75) Inventors: Kouichi Kumagai, Shizouka (JP); Kazuyoshi Miyachi, Shizouka (JP); Tadao Isobe, Shizuoka (JP); Hideyuki Ooishi, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 09/940,598

(22) Filed: Aug. 29, 2001

(65) Prior Publication Data

US 2002/0063032 A1 May 30, 2002

(30) Foreign Application Priority Data

Sep. 6, 2000 (JP) .......................................... 2000-274980

(51) Int. Cl.$^7$ .............................................. F16D 69/00
(52) U.S. Cl. ................................. 188/250 E; 188/250 B
(58) Field of Search ........................... 192/105 CD, 72; 188/184, 250 B, 250 E

(56) References Cited

U.S. PATENT DOCUMENTS

| | | | | |
|---|---|---|---|---|
| 3,680,674 A | * | 8/1972 | Horstman | 192/103 B |
| 3,693,772 A | * | 9/1972 | Tani | 188/250 E |
| 4,294,342 A | * | 10/1981 | St. John | 192/105 CD |
| 4,754,859 A | * | 7/1988 | Ouchi et al. | 192/45 |
| 5,577,587 A | * | 11/1996 | Jansson | 188/184 |
| 6,259,896 B1 | * | 7/2001 | Sepponen | 455/117 |
| 6,261,389 B1 | * | 7/2001 | Nakamura et al. | 148/332 |

* cited by examiner

Primary Examiner—Christopher P. Schwartz
Assistant Examiner—Devon Kramer
(74) Attorney, Agent, or Firm—Arent Fox Kintner Plotkin & Kahn, PLLC

(57) ABSTRACT

In a clutch weight for a wet centrifugal clutch, a weight member 14 is formed of a sintered metal. Thus, the cost can be reduced, while stabilizing the clutch performance and enhancing the appearance.

3 Claims, 7 Drawing Sheets

BEFORE STEAM TREATMENT

AFTER STEAM TREATMENT

CLUTCH WEIGHT FOR WET CENTRIFUGAL CLUTCH AND PROCESS FOR PRODUCING THE SAME

BACKGROUND OF THE INVENTION

1. Field of the Invention

The present invention relates to improvements in a clutch weight for use in a wet centrifugal clutch, and a process for producing the same.

2. Description of the Related Art

A clutch weight comprising a weight member made of a metal material, and a friction material bonded to the weight member is already known, for example, from Japanese Patent Application Laid-open No.11-125276. It is common that a friction material is bonded to a weight member formed by laminating and welding a plurality of iron plates one on another.

However, in the clutch weight including the weight member formed by laminating and welding the plurality of iron plates to one another, as described above, there is a possibility that a misalignment might be produced between the iron plates, resulting in an unstabilized clutch performance and in an injured appearance. To eliminate the misalignment between the iron plates, it is necessary to carry out a welding operation of a high accuracy, thereby bringing about an increase in cost. Further, when the characteristics required in the wet centrifugal clutch are changed, the number and shape of the iron plates in the conventional clutch weight must be set in accordance with the change in clutch characteristics, resulting in an increase in design load. This also brings about an increase in cost.

SUMMARY OF THE INVENTION

Accordingly, it is an object of the present invention to provide a clutch weight for a wet centrifugal clutch and a process for producing the same, wherein the cost can be reduced, while stabilizing the clutch performance and enhancing the appearance.

To achieve the above object, according to a first aspect and feature of the present invention, there is provided a clutch weight for a wet centrifugal clutch, comprising a weight member made of a metal material, and a friction material bonded to the weight member and capable of being brought into friction engagement with an inner periphery of a clutch outer, wherein the weight member is formed of a sintered alloy.

With such feature, a problem encountered in the conventional clutch weight including the weight member formed by laminating and welding the plurality of iron plates due to the misalignment between the iron plates can be eliminated by forming the weight member of the sintered alloy, thereby stabilizing the clutch performance and enhancing the appearance. Moreover, it is easy to change the density of the sintered alloy, and the clutch characteristics are also changed in accordance with the change in density. Therefore, it is possible to easily accommodate the change in characteristics required in the wet centrifugal clutch, thereby contributing a reduction in cost by cooperation with no need for a welding treatment.

According to a second aspect and feature of the present invention, in addition to the first feature, the weight member made of the iron-based sintered alloy has a density set at a value of 6 g/cm$^3$ or more. With such feature, it is possible to provide a strength of the weight member equivalent to that of the conventional weight member formed by laminating and welding the plurality of iron plates one on another.

According to a third aspect and feature of the present invention, there is provided a process for producing a clutch weight for a wet centrifugal clutch according to the first or second feature, wherein the weight member resulting from the sintering of a sintering material is subjected to a steam treatment. According to such producing process, rusts are produced in the sintering material by contact of the sintering material with steam, whereby voids created in the weight member during the sintering can be eliminated to prevent the weight member from absorbing a lubricating oil as much as possible, leading to an enhanced oil resistance of the clutch weight.

The above and other objects, features and advantages of the invention will become apparent from the following description of the preferred embodiment taken in conjunction with the accompanying drawings.

DESCRIPTION OF THE PREFERRED EMBODIMENT

The present invention will now be described by way of an embodiment with reference to the accompanying drawings.

Figure 1:
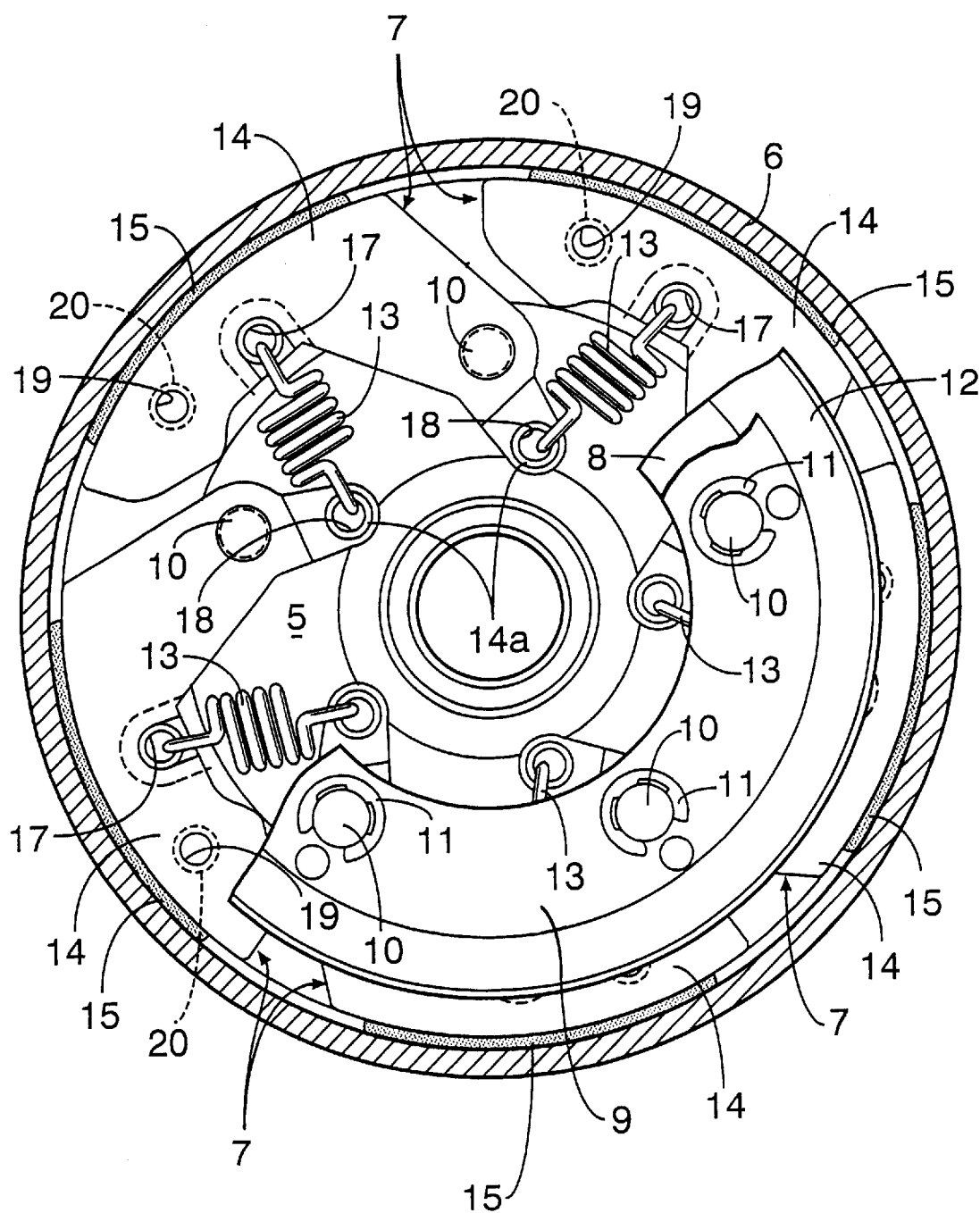
FIG. 1 is a cross-sectional front view of a wet centrifugal clutch.

Referring first to FIG. 1, a wet centrifugal clutch is used as a starting clutch for a motorcycle, for example, and includes a drive plate 5 coaxially and relatively non-rotatably coupled to a crankshaft (not shown), a bowl-shaped clutch outer 6 connected to a transmission (not shown) and coaxially covering the drive plate 5, clutch weights 7 disposed at a plurality of, e.g., five points circumferentially equally spaced apart from one another on an inner periphery of the clutch outer 6 to be capable of being brough into friction engagement with the inner periphery of the clutch outer 6, a ring-shaped clamping plate 8 for clamping the clutch weights 7 between the clamping plate 8 and the drive plate 5, a ring-shaped engage plate 9 disposed on the side of the clamping plate 8 opposite from the clutch weights 7, a plurality of, e.g., five fulcrum pins 10 engaged at one end thereof with the drive plate 5 and inserted through base ends of the clutch weights 7, the clamping plate 8 and the engage plate 9, retaining rings 11 mounted at the other ends of the fulcrum pins 10 and engaged with the engage plate 9, a belleville spring 12 interposed between the clamping plate 8 and the engage plate 9, and clutch springs 13 mounted respectively between the clutches 7 adjoining each other in a circumferential direction of the clutch outer 6 to exhibit a spring force for urging the clutch weights 7 in a direction to release the friction engagement of the clutch weights 7 and the inner periphery of the clutch outer 6.

Figure 2:
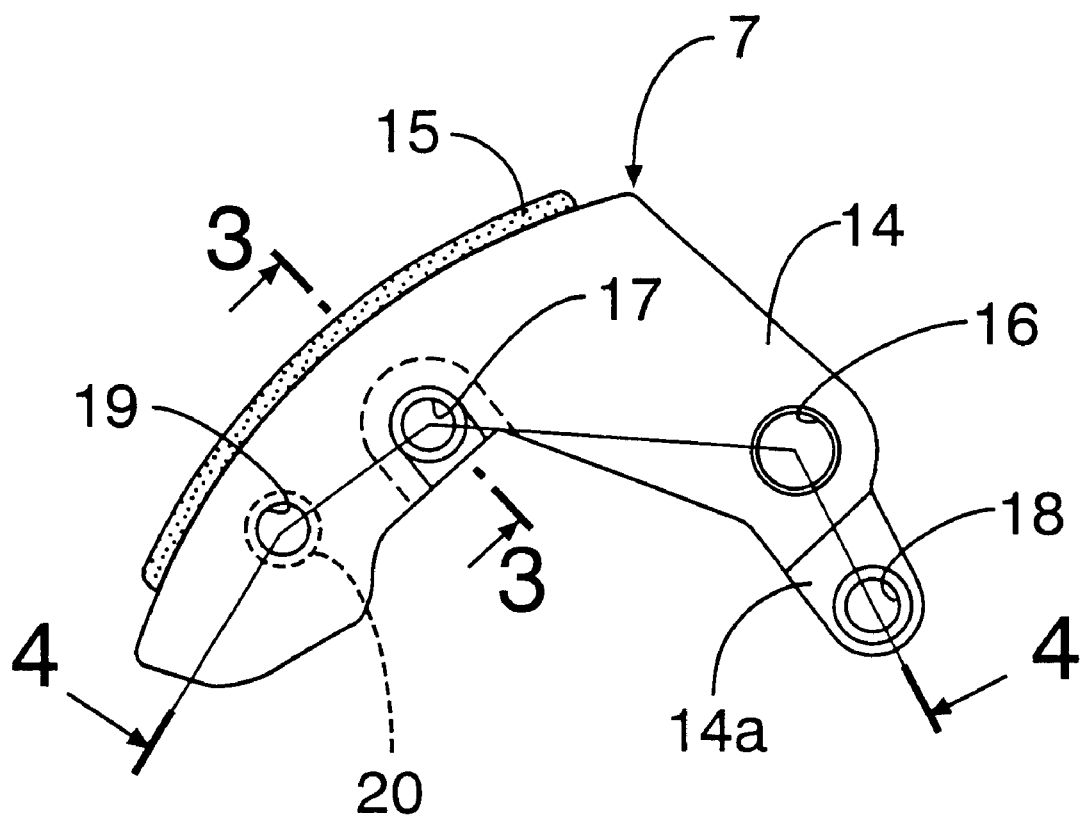
FIG. 2 is front view of a clutch weight.
Figure 3:
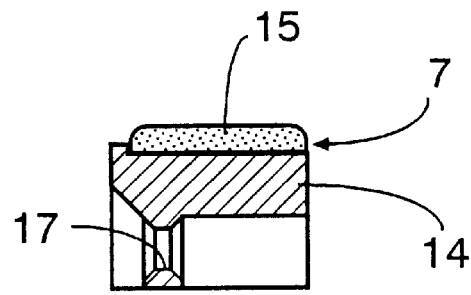
FIG. 3 is a sectional view taken along a line 3—3 in FIG. 2.
Figure 4:
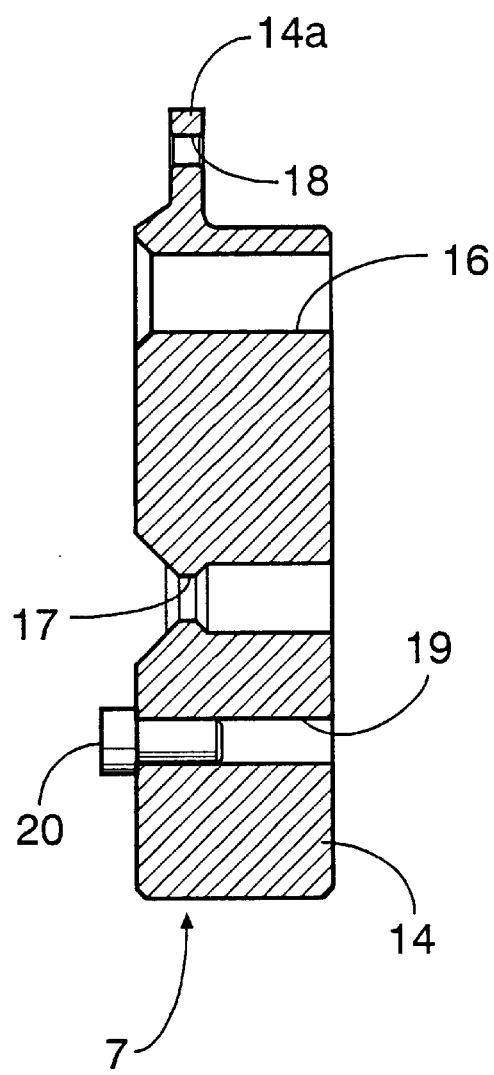
FIG. 4 is a sectional view taken along a line 4—4 in FIG. 2.

In FIG. 2, each of the clutch weights 7 comprises a weight member 14 made of an iron-based sintered metal having a density of 6 g/cm$^3$ or more, and a friction material 15 bonded to the weight member 14 and capable of being brought into friction engagement with the inner peripheral surface of the clutch outer 6.

The weight member 14 formed into a shoe-shape has a support bore 16 provided in its base end with opposite ends thereof opened, and the fulcrum pin 10 is inserted through the support bore 16. The weight member 14 also has an engage bore 17 provided in its intermediate portion, so that one end of the clutch spring 13 can be engaged into the engage bore 17 from the inward of the weight member 14 in a radial direction of the clutch outer 6. An engage bore 18 is provided in an arm 14a integrally connected to the base end of the weight member 14, so that the other end of the clutch spring 13 can be engaged into the engage bore 18. Further, a press-fit bore 19 is provided in a tip end of the weight member 14, and a stopper pin 20 is press-fitted into the press-fit bore 19 on the side of the drive plate 5. Thus, a range of turning movement of the clutch weight 7 about an axis of the fulcrum pin 10 is defined by engagement of the stopper pin 20 with the drive plate 5.

Figure 5:
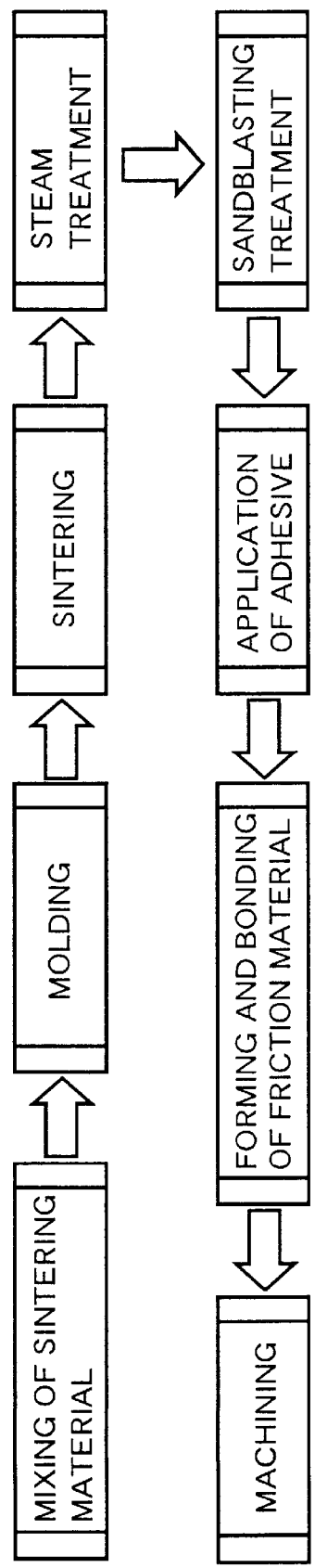
FIG. 5 is a diagram showing a process for producing the clutch weight.

Such clutch weight 7 is made through a producing process shown in FIG. 5, so that the weight member 14 can be completed by sequentially carrying out a step of mixing an iron-based sintering material, so that a finished article after sintering has a density of 6 g/cm$^3$ or more, a molding step of pouring the mixed sintering material into a mold having a shape corresponding to that of the weight member 14, a sintering step of passing the sintering material through a sintering furnace to heat the sintering material, and a steam treatment step of subjecting the weight member 14 resulting from the sintering step to a steam treatment.

Figure 6A:
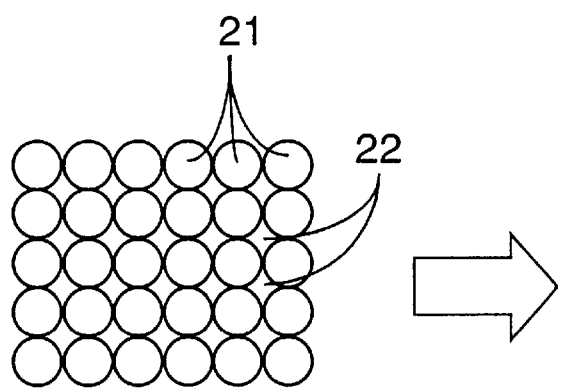
FIGS. 6A and B are diagrams showing a change produced within a weight member by a steam treatment.

It should be noted here that in a state immediately after the completion of the sintering step, there is a possibility that voids 22 might have been created in the weight member 14 between powder particles 21 bonded to one another, as shown in FIG. 6A. For this reason, if a product provided immediately after the completion of the sintering step is used, as it is, as the weight number 14 of the clutch weight 7 in the wet centrifugal clutch used within lubricating oil, the lubricating oil may be drawn into the voids 22, resulting in changed clutch characteristics.

Figure 6B:
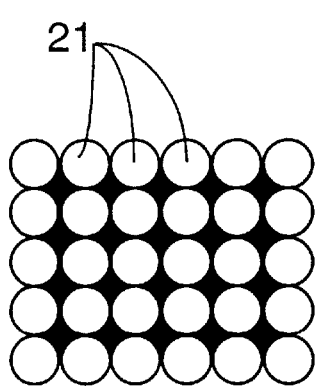

However, if the weight member 14 is subjected to the steam treatment after the completion of the sintering step, as described above, rusts are produced on the powder particles 21, whereby the voids 22 can be eliminated, as shown in FIG. 6B. Thus, it is possible to avoid the drawing of the lubricating oil into the weight member 14 as much as possible, thereby enhancing the oil resistance of the clutch weight 7.

Referring again to FIG. 5, after the steam treatment step, the clutch weight 7 can be produced sequentially through a sandblasting step, a friction material forming and bonding step and a machining step.

At the sandblasting step, a joint surface of the weight member 14 to be boded is subjected to a sandblasting treatment for enhancing the adhesion of the weight member 14 in bonding the friction material 15 to the weight member 14. At the friction material forming and bonding step, for example, a phenolic thermosetting adhesive is applied to the joint surface and dried sufficiently, and then, the friction material 15 is bonded to the weight member 14 using a forming and bonding die. Further, at the machining step, the weight member 14 is subjected to a necessary machining, thereby providing the clutch weight 7.

In the present embodiment, the stopper pin 20 is press-fitted into the press-fit bore 19 in the weight member 14. A sep of press-fitting the stopper pin 20 may be carried out between the sintering step and the steam treatment step, between the steam treatment step and the sandblasting step, or after completion of the machining step.

The operation of the embodiment will be described below. The weight member 14 of each of the clutch weights 7 used in the wet centrifugal clutch is formed of a sintered alloy and hence, it is possible to eliminate a problem encountered in a conventional clutch weight comprising a weight member formed by laminating and welding a plurality of iron plates one on another one on another due to the misalignment between the iron plates. More specifically, in the conventional clutch weight, there is a possibility that the misalignment might be produced between the iron plates during lamination and welding of the iron plates, resulting in an unstabilized clutch performance and in an injured appearance. To eliminate the misalignment between the iron plates, it is necessary to carry out a welding operation of a high accuracy, thereby bringing about an increase in cost. However, the shape of the weight member 14 made of the sintered alloy is determined consistently by the mold and hence, the clutch performance is stabilized and moreover, there is no possibility that the appearance might be injured.

When characteristics required in the wet centrifugal clutch are changed, the shape, the weight and the like of the conventional clutch weight must be changed, resulting in an increased design load and an increased cost. However, if the weight member 14 is made of the sintered alloy according to the present embodiment, the density of the weight member 14 is easy to change, and the clutch characteristics are also changed in accordance with the change in the density. Therefore, it is possible to easily accommodate the change in characteristics required in the wet centrifugal clutch, thereby contributing to a reduction in cost by cooperation with no need for a welding treatment.

Next, three types of the clutch weights 7 made of the sintered alloy according to the present embodiment and having varied densities and the conventional clutch weight comprising the weight member formed into the same shape as those of the clutch weights 7 by laminating and welding the plurality of iron plates one on another were compared with one another for the clutch characteristics and the strength, thereby providing results shown in Table 1.

TABLE 1

| Material for weight member | Density (g/cm$^3$) | Weight (g) | Tensile strength (KN) A | Tensile strength (KN) B | Characteristics (rpm) Speed of engage rotation | Characteristics (rpm) Speed of stall rotation |
|---|---|---|---|---|---|---|
| Welded iron plates | 8 | 227 | 4.0 | 3.2 | 1750 | 2900 |
| Sintered metal | 6 | 220 | 4.7 | 8.1 | 1760 | 3100 |
|  | 7 | 250 | 5.9 | 10.2 | 1650 | 2910 |
|  | 8 | 290 | 7.1 | 12.3 | 1530 | 2700 |

In Table 1, the speed of engage rotation is a rotational speed at the time when a torque has been started to be detected by a torque detector upon contact of the friction material 15 with the clutch outer 6 mounted on a torque detector, and the speed of stall rotation is a rotational speed at the time when the torque detected by the torque detector has reached a torque required in the wet centrifugal clutch.

Figure 7:
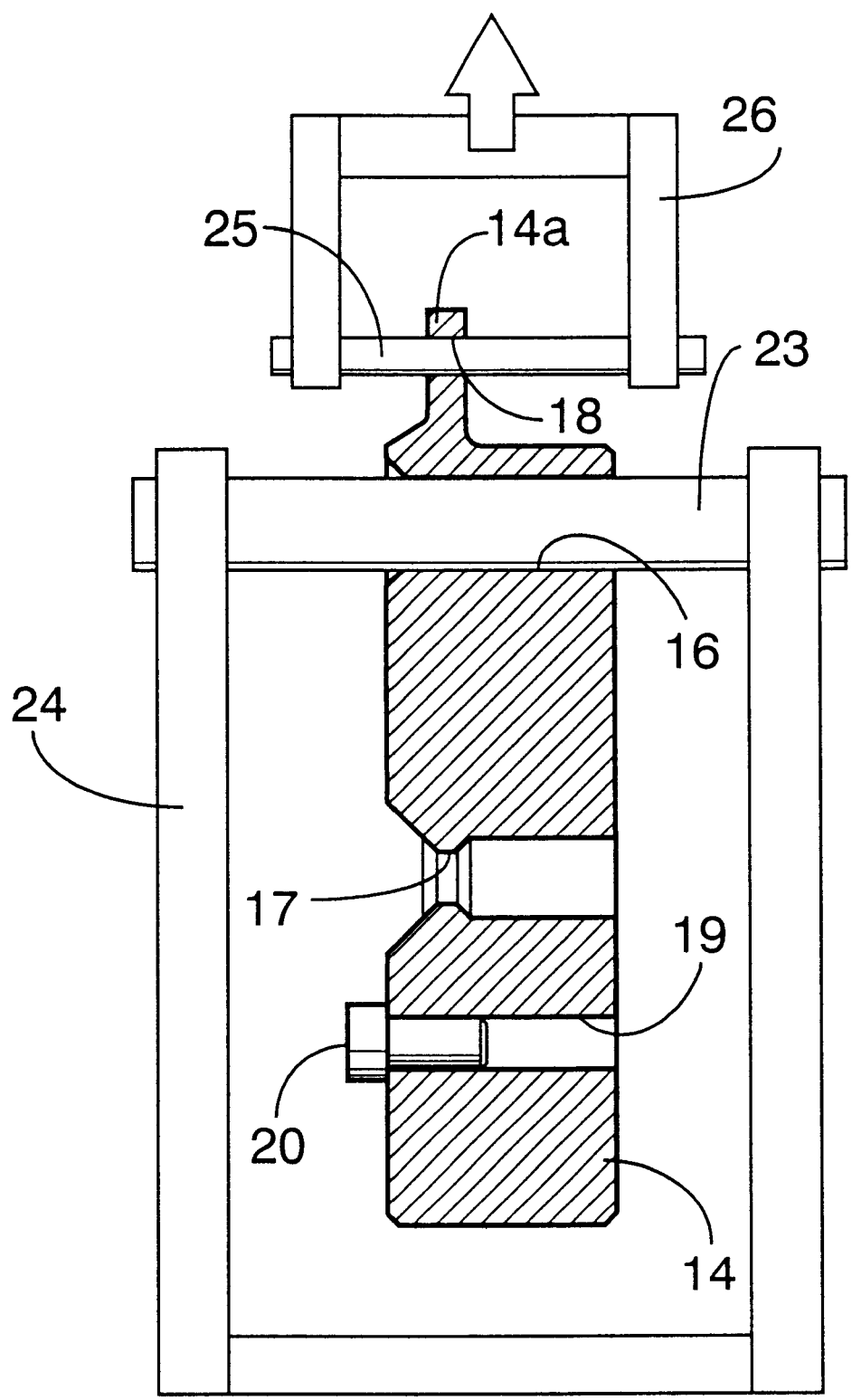
FIG. 7 is a vertical sectional view of a testing equipment for a tensile strength.

In Table 1, the tensile strength A indicates a result of a tensile strength test using a testing equipment shown in FIG. 7, and is a breaking strength provided by fixing a support frame 24 including a pin 23 inserted through the support bore 16 and by moving a support frame 26 including a pin 25 inserted through the engine bore 18 in a direction shown by an arrow in FIG. 7.

Figure 8:
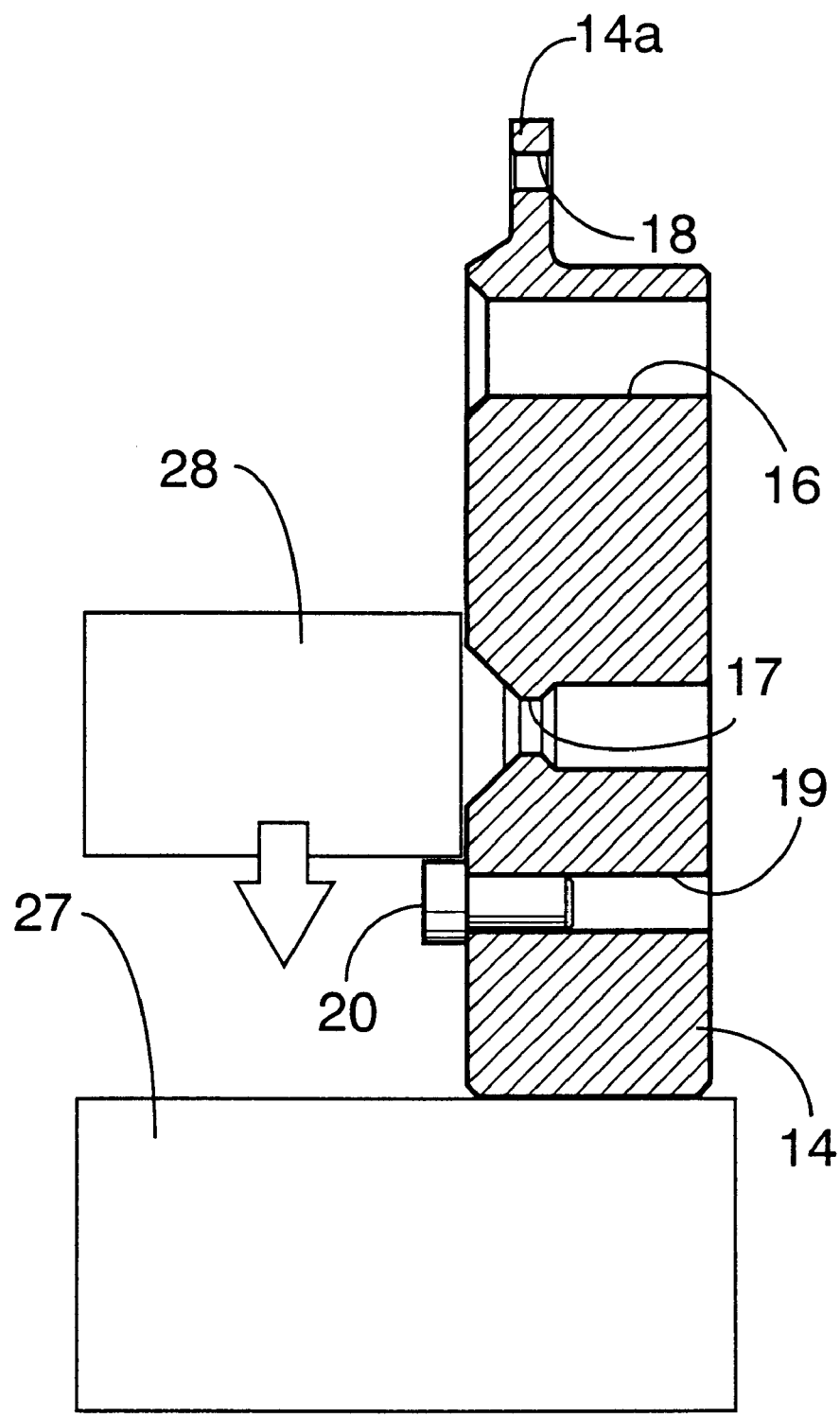
FIG. 8 is a vertical sectional view of another testing equipment for a tensile strength.

Further, in Table 1, the tensile strength B indicates a result of a tensile strength test using a testing equipment shown in FIG. 8 and is a breaking strength provided by allowing a shearing breaking tool 28 to act on a protrusion at a tip end of the stopper pin 20 press-fitted in the press-fit bore 19 from the above as shown by an arrow in FIG. 8 in a state in which the weight member 14 has been placed on and fixed to a support base 27.

As is apparent from Table 1, a strength of the weight member equivalent to that of the conventional weight member formed by laminating and welding the plurality of iron plates one on another can be provided by setting the density of the weight member 14 made of the iron-based sintered alloy at 6 g/cm$^3$ or more.

Further, the voids 22 created in the weight member 14 during the sintering can be eliminated by subjecting the weight member 14 resulting from the sintering of the sintering material to the steam treatment, thereby preventing the weight member 14 to the utmost from absorbing the lubricating oil as much as possible to enhance the oil resistance of the clutch weight 7.

Although the embodiment of the present invention has been described in detail, it will be understood that the present invention is not limited to the above-described embodiment, and various modifications in design may be made without departing from the spirit and scope of the invention defined in claims.

What is claimed is:

1. A process for producing a clutch weight for a wet centrifugal clutch, said clutch weight comprising a weight member made of a sintered alloy material, and a friction material bonded to said weight member and capable of being brought into friction engagement with an inner periphery of a clutch outer, wherein the process comprises the steps of sintering a sintering material to provide a sintered alloy weight member and subjecting the sintered alloy weight member to a steam treatment.

2. A clutch weight obtained by the process according to claim 1; wherein said weight member is made of an iron-based sintered alloy.

3. A clutch weight according to claim 2, wherein said weight member has a density set at 6 g/cm$^3$ or more.

* * * * *